United States Patent Office 3,135,594
Patented June 2, 1964

3,135,594
METHOD AND PRODUCT FOR TREATING SOIL TO SUPPRESS THE NITRIFICATION OF AMMONIUM NITROGEN THEREIN
Cleve A. I. Goring, Garden Grove, Calif., assignor to The Dow Chemical Company, Midland, Mich., a corporation of Delaware
No Drawing. Filed Sept. 1, 1961, Ser. No. 135,424
15 Claims. (Cl. 71—11)

The present invention relates to crop culture and is particularly concerned with a new agronomical practice and composition for conserving soil nitrogen and for supplying the soil nitrogen requirements for plant nutrition.

Since the majority of plants obtain most or all of their nitrogen requirements from the soil, the adequate provision of nutrient nitrogen in soil for plant growth is one of the foremost agronomic problems. The nitrogen in the soil is found to occur primarily in three forms: organic nitrogen, ammonium nitrogen and nitrate nitrogen, of which ammonium nitrogen and nitrate nitrogen are the primary forms utilized by plants. This nitrogen is absorbed by plants in solution from the soil in the form of ammonium ions and nitrate ions.

The organic nitrogen in the soil consists of a large number of nitrogen containing materials, primarily of reduced nitrogen compounds originating from animal tankages, fish products, green manure, crop residues, organic chemical fertilizers or bacterial syntheses. With the exception of certain of the chemical fertilizers such as urea, the solubility of these organic nitrogen compounds in water is very low. While they are not readily leached from the soil neither are they directly available to the plants for use. The nitrogen in the organic nitrogen compounds is made available to plants when the nitrogen therein is converted by soil bacteria to inorganic nitrogen compounds. The first inorganic nitrogen product of such bacterial action is ammonia or ammonium salts. This conversion takes place very rapidly from fertilizers such as urea and slowly from many other organic nitrogen compounds. The ammonia or ammonium nitrogen thus produced is very rapidly oxidized by soil bacteria to inorganic nitrate nitrogen. In this process the ammonium nitrogen is first oxidized to the intermediate nitrite nitrogen which is then rapidly oxidized to nitrate nitrogen. The mineralization of organic nitrogen is a means for constantly replenishing the soil with nitrogen available for plant absorption.

The ammonium nitrogen in the soil is derived from bacterial conversion of organic nitrogen as described above or from added ammonia, ammonium or other reduced nitrogen fertilizers such as anhydrous ammonia, aqueous ammonia, ammonium phosphate, ammonium nitrate, ammonium chloride and ammonium sulfate, as well as from other ammonium salts of organic and inorganic acids, and inorganic reduced nitrogen compositions, such as nitrogen-phosphorus inorganic complexes. These ammonium compounds or inorganic reduced nitrogen compounds or compositions are usually readily soluble in water or aqueous soil medium. When in solution, the reduced nitrogen occurs largely as the ammonium ion. Due to the cationic nature of this ion, the ion is strongly adsorbed on the soil colloids or base exchange complex of the soil. This colloidal-bound ammonium nitrogen exists in equilibrium with a small concentration of ammonium ions in the soil solution. Thus, the colloidal-bound ammonium nitrogen provides a dynamic nitrogen reservoir to maintain a supply of ammonium ions in the soil solution for plant adsorption. Further, since the ammonium nitrogen in the soil occurs principally as colloidal-bound nitrogen, only very small quantities of the ammonium form of soil nitrogen are lost from the feeding zone of the plants by leaching.

The nitrate nitrogen in the soil is derived from the oxidation or nitrification of ammonium nitrogen by soil bacteria as previously described, or by the addition of inorganic nitrate fertilizers such as ammonium nitrate, sodium nitrate, potassium nitrate and calcium nitrate. The inorganic nitrate compounds are readily soluble in water and the aqueous soil medium. When so dissolved, the nitrate nitrogen largely exists as the nitrate ion. Because of the anionic nature of this ion, nitrate nitrogen is rapidly leached by rainfall and irrigation and readily lost from the feeding zone of the plants. Further, the nitrate nitrogen is reduced by many soil bacteria to nitrogen gas. The latter process is known as denitrification and accounts for an additional loss of large quantities of nitrate nitrogen from the soil. The yearly loss from leaching and denitrification amounts to from 20 to 80 percent of the nitrate nitrogen found in the soil, whatever its source.

Nitrification or the conversion of the ammonium nitrogen in soil to nitrate nitrogen by bacterial action occurs at a rate which is dependent primarily upon the soil temperature and the soil pH. The rate is also somewhat dependent upon the type of soil and the moisture content of the soil. The rate of nitrification is rapid when the soil temperature is at least 10° C. and the soil pH is at least 5. For example, the conversion of ammonium nitrogen to nitrate nitrogen in sand, silt or clay loam soil having a pH of at least 6 may take place at a rate of from 20 pounds of nitrate nitrogen per acre per week at 10° C., to 500 pounds of nitrate nitrogen per acre per week at 35° C. Even at temperatures as low as 2° C., nitrification will oftentimes occur in such soils at a rate of 25 pounds of nitrate nitrogen per month. Thus, ammonium nitrogen is very rapidly changed to nitrate nitrogen in most agricultural soils.

The rapid nitrification of ammonium nitrogen in soil and the subsequent leaching and bacterial decomposition of nitrate nitrogen have depleted many agricultural soils of the nitrogen reserves and nitrogen requirements for plant nutrition. In order to replenish the soil nitrogen, agriculturalists have resorted to use of large amounts of nitrate fertilizers and reduced nitrogen fertilizers. In many instances, multiple fertilizer treatments during the growing season have been required to maintain adequate nitrogen requirements for plant growth. In this practice, the greater proportion of the employed fertilizers is in the form of reduced nitrogen fertilizers. The expression "reduced nitrogen fertilizers" is employed as understood in the art and embraces both inorganic and organic nitrogenous materials containing nitrogen in the reduced state. Examples of known reduced nitrogen fertilizers include anhydrous and aqueous ammonia, inorganic ammonium salts such as ammonium phosphate, ammonium nitrate and ammonium sulfate, ammonium salts of organic acids, urea, cyanamide, guanidine nitrate, dicyandiamide, amino acids, guanyl urea sulfate, thiourea, uramon, amines ureaform and other nitrogen containing organic chemical fertilizers as well as protein mixtures, animal tankages, green manure, fish products, crop residues, and other natural materials known to be sources of ammonium ions in soil. These fertilizer materials contain nitrogenous compounds in which the apparent valency or oxidation state of the nitrogen is from −3 to −1, inclusive. The organic nitrogenous materials are converted in soil to ammonia or ammonium ions. The conversion takes place readily with highly water soluble materials such as urea but more slowly with cyanamide and many organic nitrogen fertilizers. Inasmuch as the following equilibrium exists in the presence of water even when the latter is present in minor proportions

it is to be understood that when reference is made to either ammonium ion or ammonia in soil it is meant to embrace the other component, namely, ammonia or ammonium ion, respectively.

Since the nitrogen must be present as nitrate nitrogen before substantial quantities can be leached from the soil or lost by denitrification, the application of nitrogen as reduced nitrogen fertilizers provides the agriculturalist with a short interval during which available reduced nitrogen is at a maximum and conditions for leaching and denitrification are at a minimum. This interval is particularly advantageous during the initial growth of seeds and emerging seedlings when high soil nitrogen concentrations are very desirable. In addition, the ammonium nitrogen absorbed by plants is immediately available for assimilation into organic materials being synthesized thereby. In contrast, the nitrate nitrogen must be reduced before it can be assimilated in the synthesis of plant materials. This reduction is carried out in the plant usually at the expense of synthesized carbohydrate. Although some plants seem to do well on either ammonium nitrogen or nitrate nitrogen as a source of nitrogen nutrients, many plants such as potato, corn, rice, buckwheat, pineapple, cotton and orange prefer ammonium nitrogen and appear to grow best in the presence of substantial amounts of this form of nitrogen. Thus, the need for a method of suppressing the rapid loss of soil nitrogen is well recognized by agriculturalists.

An object of the present invention is to provide a new and improved agronomic practice for conserving soil nitrogen. A further object is the provision of a new and improved method for suppressing the loss of soil nitrogen. An additional object is the provision of a new and improved method for suppressing the loss of ammonium nitrogen from soil. Another object is the provision of a new and improved method for supplying soil with nitrogen available for plant growth. Another object is the provision of a new and improved method for suppressing the loss of reduced nitrogen fertilizer supplements from soil. An additional object is the provision of a new and improved method for suppressing the nitrification of ammonium nitrogen in soil. Another object is the provision of a new and improved method for suppressing the conversion in soil of ammonium ions to nitrate ions. An additional object is the provision of novel compositions to be employed in the new methods of the present invention. Other objects will become apparent from the following specification and claims.

The new agronomical practice for improving plant nutrition and conserving soil nitrogen comprises treating plant growth media with a (trichloromethyl)pyridine compound. By the expression "(trichloromethyl)pyridine compound" is meant a compound having a pyridine nucleus and being substituted thereon by at least one trichloromethyl group and mineral acid salts of such compounds. Among the suitable compounds are those containing chlorine or methyl substituents on the pyridine nucleus in addition to a trichloromethyl group and are inclusive of chlorination products of methylpyridines such as lutidine, collidine and picoline. Suitable salts include hydrochlorides, nitrates, sulfates and phosphates. The (trichloromethyl)pyridine compounds useful in the practice of the present invention are oily liquids or crystalline solid materials adapted to be readily and conveniently distributed in soil.

By the practice of this invention, the nitrification of ammonium nitrogen in the soil to nitrate nitrogen is suppressed thereby preventing the rapid loss of ammonium nitrogen from the soil. Furthermore, by proper distribution of the (trichloromethyl)pyridine compound, this action of inhibiting the transformation of ammonium nitrogen to nitrate nitrogen is effective over a prolonged period of time. The ammonium nitrogen may arise from added ammonium nitrogen fertilizers or be formed in the soil by conversion of the organic nitrogen constituents found in soil or added thereto as components of organic fertilizers.

The provision of an effective dosage of the (trichloromethyl)pyridine compound in the soil or growth medium is essential for the practice of the present invention. In general, good results are obtained when the growth medium is impregnated with the (trichloromethyl)pyridine compound in the amount of from about 0.01 part to about 4000 parts or more by weight per million parts by weight of growth medium. (Hereinafter, the abbreviation p.p.m. when employed is meant to designate parts by weight or (trichloromethyl)pyridine compound per millon parts by weight of soil or growth medium.) The preferred amounts to be employed are dependent upon the particular situation. Thus, in determining the amount to be employed, consideration is made not only of the treatment need, i.e., soil pH, temperature, soil type etc. but also of the mode of application to soil. When the (trichloromethyl)pyridine compound is to be applied in a broadcast application, the amount in p.p.m. may frequently be less than in row or band application where for a substantial depth and width within the vicinity of application there may be a very high concentration of the (trichloromethyl)pyridine compound. When application is made near the root zone of growing plants or when application is made immediately prior to seeding or transplanting, the amounts supplied are frequently at a lower rate than when application is made at the end of the growing season to prepare the soil for the following season. By dispersing very large dosages in growth media, a prolonged inhibition of nitrification may be obtained over a period of many months. The concentration of the active (trichloromethyl)pyridine compound is eventually reduced to a minimum by decomposition in the soil.

In one method for carrying out the present invention, the (trichloromethyl)pyridine compound is distributed throughout the growth media in a broadcast application such as by spraying, dusting, distributing in irrigation water, etc. In such application, the (trichloromethyl)pyridine compound is supplied in amounts sufficient to permeate the growing area of soil with an amount of from about 0.01 to about 1000 p.p.m. In field administration, the (trichloromethyl)pyridine compound may be distributed in the soil in the amount of at least 0.02 pound per acre and through such cross-section of the soil as to provide for the presence therein of an effective concentration of the agent. It is usually preferred that the (trichloromethyl)pyridine compound be distributed to a depth of at least two inches below the soil surface and at a dosage of at least 0.1 pound per acre inch of soil.

In another method for carrying out the present invention, the (trichloromethyl)pyridine compound is administered to growth medium in a band or row application. In such application, administration is made with or without carrier in amounts sufficient to supply to soil or growth medium a concentration of the (trichloromethyl) pyridine compound which may be as high as 4000 p.p.m. or more. After administration with or without discing or dragging, subsequent irrigation or rainfall distributes the (trichloromethyl)pyridine compound throughout the growth medium.

In one embodiment of the present invention, the (trichloromethyl)pyridine compound is distributed throughout the growth media prior to seeding or transplanting the desired crop plant.

In another embodiment, the soil in the root zone of growing plants is treated with the (trichloromethyl)pyridine compound in an amount effective to inhibit nitrification but sublethal to plant growth. In such operations, the compounds should be supplied in the soil in amounts which have preferred upper limits at about 50 p.p.m. By following such practice, no adverse effect is exerted by the (trichloromethyl)pyridine compound upon growth or seeds or plants. Oftentimes it is desirable to treat the soil adjacent to plants, and this procedure may be carried out conveniently in side-dressing operations.

In a further embodiment, soil may be treated with the compounds following harvest or after fallowing to prevent rapid loss of ammonium nitrogen and to build up the ammonium nitrogen formed by conversion of organic nitrogen compounds. Such practice conserves the soil nitrogen for the following growing season. In such application, the upper limit is primarily an economic consideration.

In an additional embodiment, the soil is treated with the (trichloromethyl)pyridine compound in conjunction with the application of reduced nitrogen fertilizers. The treatment with the (trichloromethyl)pyridine compound may be carried out prior to, subsequent to or simultaneously with the application of fertilizers. Such practice prevents the rapid loss of the ammonium nitrogen added as fertilizer and the ammonium nitrogen formed from the organic reduced nitrogen in fertilizers by the action of soil bacteria. The administration to the soil of the (trichloromethyl)pyridine compound in an ammonium nitrogen fertilizer composition constitutes a preferred embodiment of the present invention.

The present invention may be carried out by distributing the (trichloromethyl)pyridine in an unmodified form through growth medium. The present method also embraces distributing the compound as a constituent in liquid or finely divided solid compositions. In such practice, the (trichloromethyl)pyridine compound may be modified with one or more additaments or soil treating adjuvants including water, petroleum distillates or other liquid carriers, surface-active dispersing agents, finely divided inert solids and nitrogen fertilizers. Depending upon the concentration of the (trichloromethyl)pyridine compound, such augmented composition may be distributed in the soil without further modification or be considered a concentrate and subsequently diluted with additional inert carrier to produce the ultimate treating composition. The required amount of the (trichloromethyl)pyridine compound may be supplied to growth media in from 1 to 50 gallons of organic solvent carrier, in from 5 to 27,000 or more gallons of aqueous carrier or in from about 20 to 2,000 pounds of solid carrier per acre treated. When an organic solvent carrier is employed, it may be further dispersed in the above volume of aqueous liquid carrier.

The concentration of the (trichloromethyl)pyridine compound in compositions to be employed for the treatment of growth media is not critical and may vary considerably provided the required dosage of effective agent is supplied to the growth media. The concentration of the (trichloromethyl)pyridine compound may vary from 0.00001 percent by weight to 95 percent by weight of the composition, depending on whether the composition is a treating composition or a concentrate composition and whether it is in the form of a solid or a liquid. In aqueous liquid treating compositions, concentrations of from 0.00001 percent to 0.25 percent by weight of the (trichloromethyl)pyridine compound is considered the preferred composition. The concentration of the (trichloromethyl)pyridine compound in organic solvents may be from 2.0 to 50 percent by weight. Concentrate liquid compositions generally contain from 2.5 to 50 percent by weight of the (trichloromethyl)pyridine compound. Solid compositions may contain the (trichloromethyl)pyridine compound in amounts as high as 95 percent by weight of the active compound. Treating compositions generally contain 0.0001 percent to 10 percent by weight of the (trichloromethyl)pyridine compound. Concentrate compositions contain from 2.5 to 95 percent of the (trichloromethyl)pyridine compound.

Liquid compositions containing the desired amount of the (trichloromethyl)pyridine compound may be prepared by dispersing the latter in one or more liquid carriers such as water or an organic solvent, with or without the aid of a suitable surface-active dispersing agent or emulsifying agent. Suitable organic solvents include acetone, diisobutylketone, methanol, ethanol, isopropyl alcohol, diethyl ether, toluene, methylene chloride, chlorobenzene and the petroleum distillates. The preferred organic solvents are those which are of such volatility that they leave little permanent residue in the soil. When the solutions of the (trichloromethyl)pyridine compound in organic solvents are to be further diluted to produce aqueous dispersions, the preferred solvents include acetone and the alcohols. When the liquid carrier is entirely organic in nature, particularly desirable carriers are the petroleum distillates boiling almost entirely under 400° F. at atmospheric pressure and having a flash point above about 80° F. Dispersing and emulsifying agents which may be employed in liquid compositions include condensation products of alkylene oxides with phenols and organic acids, alkyl aryl sulfonates, polyoxyalkylene derivatives of sorbitan esters, complex ether alcohols, mahogany soaps and the like. The surface-active agents are generally employed in the amount of from 1 to 20 percent by weight of the (trichloromethyl)pyridine compound.

Solid compositions containing the active (trichloromethyl)pyridine compound may be prepared by dispersing the latter in finely divided inert solid carriers such as talc, chalk, gypsum, vermiculite, bentonite and the like, fuller's earth, attapulgite and the other clays, various solid detergent dispersing agents and solid fertilizer compositions. In preparing such compositions, the carrier is mechanically ground with the (trichloromethyl)pyridine compound or wet with a solution or dispersion thereof in a volatile organic solvent. Depending upon the proportions of ingredients, these compositions may be employed without further modification or be considered concentrates and subsequently further diluted with solid surface-active dispersing agent, talc, chalk, gypsum, or the like to obtain the desired treating composition. Furthermore, such concentrate compositions may be dispersed in water with or without added dispersing agent or agents to prepare aqueous soil treating compositions.

Soil treatment compositions may be prepared by dispersing (trichloromethyl)pyridine compound in fertilizers such as ammonium fertilizer or organic nitrogen fertilizer. The resulting fertilizer composition may be employed as such or may be modified as by dilution with additional nitrogen fertilizer or with inert solid carrier to obtain a composition containing the desired amount of active agent for treatment of soil. Further, an aqueous dispersion of the (trichloromethyl)pyridine compound-fertilizer composition may be prepared and administered to the growth medium. Fertilizer compositions comprising the (trichloromethyl)pyridine compound in intimate admixture with ammonium fertilizers constitute preferred embodiments of the present invention.

In fertilizer compositions comprising a reduced nitrogen fertilizer, it is desirable that the (trichloromethyl)pyridine compound be present in an amount of at least about 0.05 percent by weight based on the weight of the nitrogen present in the fertilizer as reduced nitrogen and may be present in amounts as high as 95 percent by weight of the reduced nitrogen in the fertilizer. Thus, when a fertilizer composition contains both reduced nitrogen and other forms of nitrogen such as in the case of ammonium nitrate fertilizer compositions, the amount of (trichloromethyl)pyridine compound is based on the weight of nitrogen present in the ammonium component.

In operations carried out in accordance with the present invention, the soil may be impregnated in any convenient fashion with the active (trichloromethyl)pyridine compound or a composition containing the latter. For example, these modified or unmodified compositions may be mechanically mixed with the soil; applied to the surface of soil and thereafter dragged or disced into the soil to a desired depth; or transported into the soil with a liquid carrier such as by injection, spraying or irrigation. When the distribution is carried out by introducing the (trichloromethyl)pyridine compound in the water employed to irrigate the soil, the amount of water is varied in accordance with the moisture content of the soil in order to obtain a distribution of the (trichloromethyl)pyridine compound to the desired depth. The (trichloromethyl)pyridine compound may be readily and conveniently distributed to a depth of a few inches to four feet by irrigation methods. The preferred methods embrace procedures using any of these steps or combination of steps wherein the (trichloromethyl)pyridine compound is distributed in the soil substantially simultaneously with a reduced nitrogen fertilizer.

The following examples illustrate the invention but are not to be construed as limiting.

EXAMPLE 1

An aqueous ammonium fertilizer composition containing 500 parts by weight of nitrogen and 50 parts by weight of 2,6-bis(trichloromethyl)pyridine per million parts of aqueous medium was prepared by dispersing a 4 percent (weight by volume of solvent) acetone solution of 2,6-bis(trichloromethyl)pyridine in aqueous ammonium sulfate solution. (The amount of nitrogen in all examples is based on the nitrogen present in the fertilizer in the reduced form.)

The composition so prepared was employed to treat seed beds of sandy loam soil having a pH of about 8, containing essentially no organic material and having been freed of nitrite and nitrate nitrogen by prior thorough leaching. In the treating operation, the composition was applied to the seed beds as a soil drench, and the soil in the beds thoroughly mixed to insure a substantially uniform distribution of the composition throughout the soil. The amount of composition employed was sufficient to supply 100 parts by weight of nitrogen and 10 parts by weight of 2,6-bis(trichloromethyl)pyridine per million parts by weight of soil. In a check operation, other seed beds similarly prepared were fertilized with a similar aqueous fertilizer composition containing the same amount of acetone and ammonium sulfate but no 2,6-bis(trichloromethyl)pyridine. The composition was applied in an amount to supply the same concentration of nitrogen to the soil as the treating composition containing 2,6-bis(trichloromethyl)pyridine. The soil temperature of all seed beds was maintained at about 70° F. for the period of the determination.

At various intervals following treatment, samples of soil were taken from the different seed beds and the extent of nitrification of the added ammonium sulfate fertilizer determined by analyses for combined nitrate plus nitrite nitrogen. The determinations were carried out by extracting the nitrate and nitrite from the soil with a saturated calcium sulfate solution, developing color in the clear supernatant of the extract with diphenylamine in sulfuric acid, and comparing the color with a standard solution containing known concentrations of nitrate and nitrite ions. This procedure is similar to that described in "Colorimetric Methods of Analysis," by F. D. Snell and C. T. Snell, D. Van Nostrand Company, Inc., volume II, 3d edition, page 801.

The percent nitrification of added ammonium sulfate at various intervals is set forth in the following table:

Table I

| Interval Following Treatment in Days | Percent Nitrification | |
|---|---|---|
| | Soil Treated with Ammonium Sulfate + 2,6-Bis(trichloromethyl)pyridine | Soil Treated with Ammonium Sulfate (Check) |
| 7 | 0 | 100 |
| 21 | 0 | 100 |
| 35 | 0 | 100 |
| 49 | 0 | 100 |
| 70 | 0 | 100 |
| 88 | 0 | 100 |
| 105 | 5 | 100 |
| 119 | 5 | 100 |

EXAMPLE 2

An experiment was carried out in a manner similar to that described in Example 1 but wherein the final concentrations of the 2,6-bis(trichloromethyl)pyridine were greatly reduced. Aqueous ammonium fertilizer compositions containing 500 parts by weight of nitrogen and 25 and 10 parts by weight, respectively, of 2,6-bis(trichloromethyl)pyridine per million parts of aqueous media were prepared by dispersing a 2 percent (weight by volume of solvent) acetone solution of 2,6-bis(trichloromethyl)pyridine in aqueous ammonium sulfate. These compositions were applied to soil beds to give a concentration of nitrogen therein of 100 parts by weight and of the pyridine compound of 5 parts and 2 parts by weight per million parts by weight of soil, respectively. The degree of nitrification was determined after an interval of 24 days and found to be 0 percent and 5 percent, respectively. A check operation carried out with a composition containing no 2,6-bis(trichloromethyl)pyridine showed 100 percent nitrification.

EXAMPLE 3

Ammonium sulfate and an acetone solution containing 4 percent (weight by volume of solvent) of various (trichloromethyl)pyridine compounds were dispersed in water to prepare aqueous compositions containing 1,000 parts by weight of nitrogen and 50 parts by weight of a (trichloromethyl)pyridine compound per million parts by weight of ultimate mixture. The compositions were applied to seed beds of sandy loam soil similar to that described in Example 1, in amounts sufficient to provide 200 parts by weight of nitrogen and 10 parts by weight of pyridine compound per million parts by weight of soil. A check operation was simultaneously carried out on other seed beds employing a similar aqueous fertilizer composition but containing no (trichloromethyl)pyridine compound.

At various intervals following treatment, samples of soil from the different seed beds were analyzed for their content of nitrite plus nitrate nitrogen and the percent nitrification of ammonium sulfate determined. The soil treating compositions employed and the percentage nitrification at the various observation intervals are set forth in Table II.

Table II

| Haloalkylpyridine Added to Ammonium Sulfate | Percent Nitrification at Indicated Interval After Treatment in Days | | |
|---|---|---|---|
| | 27 Days | 63 Days | 84 Days |
| 3,5-Dichloro-2-(trichloromethyl)pyridine | 5 | 10 | 15 |
| 3,4,5-Trichloro-2-(trichloromethyl)pyridine | 5 | 10 | 10 |
| 2-(Trichloromethyl)pyridine | 5 | 15 | 38 |
| Chloro-2,6-bis(trichloromethyl)pyridine [1] | 10 | 10 | 15 |
| None (check) | 100 | 100 | 100 |

[1] Product boiling at 136°–138° C. at 1 millimeter pressure obtained by the photochlorination of 2,6-lutidine.

EXAMPLE 4

Ammonium sulfate and an acetone solution containing 2 percent (weight by volume of solvent) of a mixture of 2,4,6-tris(trichloromethyl)pyridine and 3-chloro-2,4,6-tris(trichloromethyl)pyridine having a boiling range of 152°–186° C. at 4.7 millimeters pressure were dispersed in water to prepare an aqueous composition containing 500 parts by weight of nitrogen and 25 parts by weight of the mixture of (trichloromethyl)pyridine compounds per million parts by weight of ultimate mixture. This composition was applied to sandy loam soil in an amount sufficient to provide 100 parts by weight of nitrogen and 5 parts by weight of the mixture of (trichloromethyl)pyridine compounds per million parts by weight of soil.

At intervals following the treatment, samples of soil from the different seed beds were analyzed for their content of nitrite plus nitrate nitrogen and the percent nitrification of ammonium sulfate determined. After an interval of 7 days, a 0 percent degree of nitrification was obtained. A check operation carried out simultaneously on other seed beds employing a similar aqueous fertilizer composition but containing no (trichloromethyl)pyridine compound showed 100 percent nitrification.

EXAMPLE 5

An operation is carried out in a manner similar to that described in Example 4 but wherein 4-(trichloromethyl)-pyridine·hydrochloride is employed.

Determinations made at periodic intervals for three weeks show that soil treated with fertilizer composition containing 4-(trichloromethyl)pyridine·hydrochloride undergoes no substantial nitrification while soil treated with fertilizer compositions containing no 4-(trichloromethyl)-pyridine undergoes complete nitrification.

EXAMPLE 6

Concentrate compositions are prepared as follows:

(A) 25 parts by weight of 4-methyl-2-(trichloromethyl)pyridine, 65 parts of xylene and 10 parts of an alkylated aryl polyether alcohols (Triton X–100) are mechanically mixed together to obtain an emulsifiable liquid composition.

(B) 90 parts by weight of 2,4-bis(trichloromethyl)pyridine and 10 parts of an alkyl aryl sulfonate (Acto 700) are mechanically mixed together to obtain a water-dispersible mixture.

These compositions may be dispersed in water to produce aqueous compositions having desirable wetting and penetrating properties. These aqueous compositions are then employed to treat soil in an amount sufficient to distribute the (trichloromethyl)pyridine compound therein in effective concentrations. The concentrates may also be dispersed in aqua ammonia to prepare fertilizer compositions.

EXAMPLE 7

Fertilizer compositions are prepared as follows:

(A) 3,5-dichloro-2-(trichloromethyl)pyridine is mechanically mixed with diammonium phosphate to prepare reduced nitrogen fertilizer compositions containing 5 percent by weight of 3,5-dichloro-2-(trichloromethyl)pyridine.

(B) Nitrate salt of 2-(trichloromethyl)pyridine is mechanically mixed with ammonium nitrate to prepare reduced nitrogen fertilizer compositions containing 3 percent by weight of the nitrate salt of 2-(trichloromethyl)pyridine.

(C) 3-chloro-2,6-bis(trichloromethyl)pyridine is mechanically mixed with urea to prepare reduced nitrogen fertilizer compositions containing 2 percent by weight of 3-chloro-2,6-bis(trichloromethyl)pyridine.

These fertilizer compositions are distributed in soil to supply the nitrogen requirements for plant nutrition. The treated soil is resistant to nitrification and provides nitrogen available for plant growth over a prolonged period of time.

EXAMPLE 8

Aqueous ammonium fertilizer compositions containing 1,000 parts by weight of nitrogen and 50 parts by weight of 2-(trichloromethyl)pyridine in a million parts of aqueous media are prepared by dispersing an acetone solution containing 4 percent (weight by volume of solvent) of 2-(trichloromethyl)pyridine in aqueous solutions of the following ammonium compounds: ammonium nitrate, aqua ammonia, diammonium phosphate and monoammonium phosphate.

In an operation similar to that described in Example 1, the soil in seed beds is treated with the above described compositions to distribute a particular composition throughout the soil in an amount sufficient to supply a concentration in the soil of 200 parts by weight of nitrogen and 10 parts by weight of 2-(trichloromethyl)pyridine per million parts by weight of soil. The treated soil is maintained at 70° F. for the period of the determination. At various intervals, samples of the soil are taken and analyses made to determine the extent of nitrification.

Soils treated with the ammonium phosphates and aqua ammonia are analyzed for nitrate plus nitrite nitrogen as previously described. The soils treated with ammonium nitrate are analyzed for residual ammonia by extracting the soil with 2 molar potassium chloride and the ammonia in the extract determined by comparisons with a standard on a spot plate using Nessler's reagent as indicator.

Determinations made at periodic intervals for three weeks show that soil treated with fertilizer compositions containing 2-(trichloromethyl)pyridine undergoes no substantial nitrification while soil treated with a fertilizer composition containing no 2-(trichloromethyl)pyridine undergoes complete nitrification.

EXAMPLE 9

A solid fertilizer composition was prepared as follows: (1) an inhibitor component was prepared by (a) mixing and grinding together 0.2 gram of 5-chloro-2-(trichloromethyl)pyridine and 0.3 gram of attapulgite, (b) adding 1.5 grams of pyrophyllite thereto and grinding the resulting mixture until a finely powdered uniform composition was obtained; (2) a fertilizer component was prepared by hammermilling together a 50:50 mixture by weight of ammonium sulfate and pyrophyllite to obtain a fine uniform composition; (3) the inhibitor component and fertilizer component were mixed together in various ratios on a roller mill to obtain a soil treating composition containing 5-chloro-2-(trichloromethyl)pyridine in varying concentrations expressed in percent based on the nitrogen in the composition. These compositions were employed to fertilize various beds of sandy loam soil containing essentially no organic material and having a pH of about 8. The soil employed had been previously leached to remove all nitrate and nitrite nitrogen constituents. A sufficient amount of water was added to the various beds to give the soil in the beds varying moisture content. The beds were fertilized in areas to be planted by providing depressions and adding thereto the fertilizer treating composition and then covering the composition with soil. The amount of composition employed was sufficient to supply 160 parts by weight of nitrogen per million parts by weight of soil. The soil was maintained in the temperature range of from 70° to 85° F. for three weeks. At the end of this period, samples of soil were analyzed for content of nitrate plus nitrite nitrogen to determine the extent of nitrification of the added ammonium sulfate. The results were compared with check determinations wherein no 5-chloro-2-(trichloromethyl)pyridine was added to the fertilizer composition. The results obtained are given in Table III.

Table III

| Concentration of 5-Chloro-2-(trichloromethyl)pyridine as Percent Based on the Nitrogen in the Composition | Percent Moisture in Soil | Incubation Period in Days | Percent Nitrification |
|---|---|---|---|
| 10 | 20 | 22 | 10 |
| 0 (check) | 20 | 22 | 88 |
| 5 | 20 | 21 | 10 |
| 0 (check) | 20 | 21 | 80 |
| 2 | 20 | 22 | 10 |
| 0 (check) | 20 | 22 | 70 |

EXAMPLE 10

Irrigation water was modified by adding an acetone solution containing 5 percent (weight by volume of solvent) of 3,5-dichloro-2-(trichloromethyl)pyridine to give a concentration of the latter in the aqueous medium of 50 parts by weight in a million parts of water.

The water modified as described above was employed to irrigate dry sandy loam soil having a pH of 8 and previously leached to remove any nitrite and nitrate present. The depth of the sandy loam bed was 20–21 inches. An amount of modified water equal to six inches depth of an equal volume of soil was added and allowed to equilibrate in the soil by standing for several days. At the end of this period, samples of soil from various depths were taken. To each sample a sufficient volume of an aqueous ammonium sulfate solution containing 2,500 parts of nitrogen by weight per million parts of water was added to give a composition containing 100 parts by weight of nitrogen per million parts of soil. The fertilized soil samples were thereafter maintained in the temperature range of from 70° to 85° F. At periodic intervals, samples of the soil were taken and analyses made on the nitrate plus nitrite nitrogen to determine the extent of nitrification. The results are given in Table IV.

Table IV

| Sample of Soil Taken | Depth in Inches | Percent Nitrification at Indicated Number of Days after Incubation | | | |
|---|---|---|---|---|---|
| | | 7 Days | 14 Days | 21 Days | 28 Days |
| 1 | 0–1 | 0 | 0 | 0 | 0 |
| 2 | 1–3 | 0 | 0 | 0 | 5 |
| 3 | 3–5 | 0 | 0 | 0 | 0 |
| 4 | 7–9 | 5 | 5 | 0 | 0 |
| 5 | 9–11 | 0 | 0 | 0 | 0 |

A check operation was carried out by irrigating soil with unmodified water. In determinations made on various layers of soil of the check operation, it was found that after 7 days there was 100 percent nitrification at all depths of the soil.

EXAMPLE 11

An aqueous soil treating composition containing 100 parts by weight of 2-(trichloromethyl)pyridine, 1,000 parts by weight of nitrogen as ammonium sulfate and 500 parts by weight of phosphorus as phosphoric acid was prepared by dispersing a 4 percent (weight per volume of solvent) acetone solution of 2-(trichloromethyl)pyridine into an aqueous solution of ammonium sulfate and phosphoric acid.

Pots were prepared by planting with 500 grams of sandy loam soil having a pH of 8 and a 4 percent moisture content. 200 milliliters of the treating composition prepared as described above was poured over the soil (an amount equal to about 1 inch of liquid) to supply to the soil the 2-(trichloromethyl)pyridine in an amount sufficient to give a concentration of 40 parts by weight of the latter per million parts by weight of soil and a concentration of nitrogen of 400 parts by weight per million parts by weight of soil. The treated soil was then covered with paper to reduce evaporation and maintained in the temperature range of from 70° to 80° F.

After a period of six weeks, the soil in the pots was leached with 6 inches of water and thereafter planted with two species. Each pot was planted with five milo plants and a thick stand of rye. After an appropriate growth interval, the tops of the plants were harvested just above ground level and weighed. The average fresh weight in grams per pot was determined at the time of harvest which was 46 days for milo plants and 47 days for rye plants.

A check operation was carried out simultaneously wherein soil in pots was similarly fertilized with a composition containing the same amount of ammonium sulfate, phosphoric acid and acetone but no 2-(trichloromethyl)pyridine.

The weights of the plant tops at harvest in both the treating and check operations are set forth in Table V.

Table V

| Treating Composition | Weight of Fresh Plant Tops in Grams per Pot | |
|---|---|---|
| | Milo | Rye |
| Ammonium sulfate+phosphoric acid+2-(trichloromethyl)pyridine+acetone | 11.2 | 8.6 |
| Ammonium sulfate+phosphoric acid+acetone (check) | 7.7 | 4.8 |

EXAMPLE 12

A solid fertilizer treating composition was prepared by (1) grinding together 1.0 part by weight of 2-(trichloromethyl)pyridine with 1.5 parts by weight of attapulgite, (2) mixing this mixture with 3 times its weight of pyrophyllite, and (3) mixing the resulting mixture with 9 times its weight of a 50/40 mixture of ammonium sulfate and pyrophyllite. This treating composition contained 1 percent by weight of 2-(trichloromethyl)pyridine and 50 percent by weight of ammonium sulfate.

Pots were prepared for planting with 500 grams of sandy loam soil having a pH of 8 and a 4 percent moisture content. 200 milliliters of a phosphoric acid solution containing 500 parts by weight of phosphorus per million parts of media was poured over soil. The soil was then allowed to dry. Thereafter, a hole about ¾–1 inch deep was made in the center of each pot, and 2 grams of the solid fertilizer treating composition prepared as described above placed therein. The holes were closed by compressing the soil together. The soil thus treated contained 40 parts by weight of 2-(trichloromethyl)pyridine and 400 parts by weight of nitrogen per million parts by weight of soil. The pots were then covered with paper to reduce evaporation and maintained in the temperature range of from 70° to 80° F. for five weeks. At the end of this period, the soil in the pots was leached with 6 inches of water and then planted with 4 tomato plants per pot. After a growing period of 48 days, the tops of the plants were harvested by cutting them off at the ground level and the average fresh weight in grams per pot determined.

A check operation was carried out simultaneously wherein the soil in the pots was similarly treated with fertilizer composition containing no 2-(trichloromethyl)pyridine. The average weight of the plant tops at harvest in both the treating and check operations are set forth in Table VI.

Table VI

| Treating Composition | Weight of Fresh Tomato Plant Tops in Grams per Pot |
|---|---|
| Phosphoric acid+ammonium sulfate 2-(trichloromethyl) pyridine | 28.7 |
| Phosphoric acid+ammonium sulfate (check) | 11.3 |

EXAMPLE 13

In an operation similar to that described in Example 1, an aqeous ammonium fertilizer composition containing 1000 parts by weight of nitrogen and 5 parts by weight of 2-chloro-6-(trichloromethyl)pyridine per million parts of aqueous media was prepared by dispersing a 0.4 percent (weight by volume of solvent) acetone solution of 2-chloro-6-(trichloromethyl)pyridine in aqueous ammonium sulfate solution.

The composition so prepared was employed to treat seed beds of sandy loam soil having a pH of 7.3. In the treating operation, the composition was applied to the seed beds as a soil drench in such a manner as to insure a substantially uniform distribution of the composition throughout the soil. The amount of the composition employed was sufficient to supply 200 parts by weight of nitrogen and 1 part by weight of 2-chloro-6-(trichloromethyl)pyridine per million parts by weight of soil. In a check operation other seed beds similarly prepared were fertilized with a similar aqueous fertilizer composition containing the same amount of acetone and ammonium sulfate but no 2-chloro-6-(trichloromethyl)pyridine. The check composition was applied in an amount sufficient to supply the same concentration of nitrogen to the soil as the treating composition containing 2-chloro-6-(trichloromethyl)-pyridine. The soil temperature of all seed beds was maintained at about 70° F. for the period of the determination.

At various intervals following treatment, the seed beds were analyzed for ammonium nitrogen by distillation of the ammonia from the soil in the presence of magnesium oxide, sorption of the distilled ammonia by boric acid, and titration with a standard solution of hydrochloric acid. The recovery of ammonium nitrogen from the soil was calculated for both the treating and check operations and the percent inhibition of nitrification determined. The results are set forth in the following table:

Table VII

| Interval Following Treatment in Days | Percent Nitrification | |
|---|---|---|
| | Soil Treated with Ammonium Sulfate+2-Chloro-6-(trichloromethyl)pyridine | Soil Treated with Ammonium Sulfate (Check) |
| 28 | 4 | 100 |
| 42 | 4 | 100 |
| 70 | 7 | 100 |
| 84 | 9 | 100 |
| 140 | 13 | 100 |

EXAMPLE 14

Operations were carried out in a manner similar to that described in Example 13 but wherein the concentrations of 2-chloro-6-(trichloromethyl)pyridine were varied. Aqueous ammonium fertilizer compositions containing 1000 parts by weight of nitrogen and 1, 2.5 and 5 parts by weight, respectively, of 2-chloro-6-(trichloromethyl)pyridine per million parts of aqueous media were prepared by dispersing 0.08, 0.2 and 0.4 percent, respectively, acetone solution of 2-chloro-6-(trichloromethyl)pyridine in aqueous ammonium sulfate solution. These compositions were employed to treat seed beds of sandy loam soil having a pH of 7.3 in amounts sufficient to supply 200 parts by weight of nitrogen and 0.2, 0.5 and 1 part, respectively, of 2-chloro-6-(trichloromethyl)pyridine per million parts by weight of soil. The degree of nitrification was determined after an interval of 28 days and was found to be 6 percent, 3 percent and 4 percent, respectively. A check operation carried out with a composition containing no 2-chloro-6-(trichloromethyl)pyridine showed 100 percent nitrification.

EXAMPLE 15

A similar operation was carried out to determine the effectiveness at very low concentration and in a different soil. An aqueous ammonium fertilizer composition containing 1000 parts by weight of nitrogen and 0.1 part by weight of 2-chloro-6-(trichloromethyl)pyridine per million parts of aqeous media was prepared by dispersing a 0.008 percent acetone solution of 2-chloro-6-(trichloromethyl)pyridine in aqeuous ammonium sulfate solution. The composition was employed to treat seed beds of clay loam soil having a pH of 5.8 in an amount sufficient to supply 200 parts by weight of nitrogen and 0.02 part by weight of 2-chloro-6-(trichloromethyl)pyridine per million parts by weight of soil. The degree of nitrification was determined after an interval of 42 days and was found to be 0 percent; complete recovery of the ammonium nitrogen was obtained. In contrast, a check operation carried out with a composition containing no 2-chloro-6-(trichloromethyl)pyridine showed loss of nearly half of the ammonium nitrogen or 40 percent nitrification.

EXAMPLE 16

Reduced nitrogen fertilizer compositions containing 2-chloro-6-(trichloromethyl)pyridine were prepared by dissolving the latter in anhydrous ammonia at varying rates based on the nitrogen in the ammonia. Using a conventional tractor rig, the anhydrous ammonia compositions were side-dressed 7 inches on either side of sweet corn approximately 6 inches high growing in sandy loam soil with a pH of 7.9. The rate of application of nitrogen was 100 pounds per acre. Check plots were also established using anhydrous ammonia without added 2-chloro-6-(trichloromethyl)pyridine at amounts of 100 and 200 pounds per acre. The soil was row irrigated with 2 to 4 inches of water per week during the growing season. At harvest time, marketable ears of corn were selected and harvested and the weights thereof determined. The results indicated highly significant greater weights of marketable product from corn grown in soil fertilized with a reduced nitrogen fertilizer composition containing 2-chloro-6-(trichloromethyl)pyridine. Significantly greater yields of marketable product were also obtained from plants grown in plots treated with 2-chloro-6-(trichloromethyl)pyridine than those grown in plots fertilized with twice the amount of fertilizer but with no 2-chloro-6-(trichloromethyl)pyridine. The results are set forth in the following table:

Table VIII

| Ammonium Nitrogen Applied (Lbs./acre) | 2-Chloro-6-(trichloromethyl)pyridine in Percent of Nitrogen Applied | Pounds of Marketable Ears per Plot |
|---|---|---|
| 100 | 1.0 | 71.0 |
| 100 | 0.5 | 67.0 |
| 100 | 0.125 | 65.8 |
| 100 | 0 | 48.9 |
| 200 | 0 | 51.6 |

The (trichloromethyl)pyridine compounds employed in the compositions and methods of the present invention may be prepared by the photochlorination of methyl substituted pyridines. In carrying out the reaction, the desired amount of chlorine gas is passed through the appropriate methyl substituted pyridine, generally in the presence of a small amount of water to prevent precipitation of the hydrochloride of the pyridine compound. The desired product may be recovered by conventional procedures such as by filtration or distillation.

The preferred trichloromethyl substituted pyridines as employed in accordance with the teachings of the present invention include compounds having in addition to one or more trichloromethyl groups such other substituents as methyl and chlorine, either or both of which may occupy the several positions unoccupied by the trichloromethyl group. Such compounds are characterized by the formula

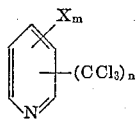

This application is a continuation-in-part of copending application Serial No. 653,065, filed April 16, 1957, now abandoned.

2-chloro-6-(trichloromethyl)pyridine is the subject matter of, and is being claimed, in a concurrent application Serial No. 152,624.

I claim:

1. A fertilizer composition useful for suppressing the nitrification of ammonium nitrogen in growth medium and for preventing rapid loss of ammonium nitrogen therefrom and improving plant nutrition therein comprising a reduced nitrogen fertilizer and 2-(trichloromethyl)pyridine as the (trichloromethyl)pyridine compound, wherein said (trichloromethyl)pyridine compound is present in a concentration of at least about 0.05 percent by weight based on the weight of the reduced nitrogen present in the fertilizer.

2. A fertilizer composition useful for suppressing the nitrification of ammonium nitrogen in growth medium and for preventing rapid loss of ammonium nitrogen therefrom and improving plant nutrition therein comprising a reduced nitrogen fertilizer and 2-chloro-6-(trichloromethyl)pyridine as the (trichloromethyl)pyridine compound, wherein said (trichloromethyl)pyridine compound is present in a concentration of at least about 0.05 percent by weight based on the weight of the reduced nitrogen present in the fertilizer.

3. A method useful for suppressing the nitrification of ammonium nitrogen in growth medium, for preventing rapid loss of ammonium nitrogen therefrom and for improving plant nutrition therein which comprises impregnating growth medium with 2,6-bis(trichloromethyl)pyridine, said impregnation being carried out in a nitrification suppressing amount of from about 0.01 part to about 4000 parts by weight per million parts by weight of growth medium.

4. A method useful for suppressing the nitrification of ammonium nitrogen in growth medium, for preventing rapid loss of ammonium nitrogen therefrom and for improving plant nutrition therein which comprises impregnating growth medium with 4-(trichloromethyl)pyridine·hydrochloride, said impregnation being carried out in a nitrification suppressing amount of from about 0.01 part to about 4000 parts by weight per million parts by weight of growth medium.

5. A method useful for suppressing the nitrification of ammonium nitrogen in growth medium, for preventing rapid loss of ammonium nitrogen therefrom and for improving plant nutrition therein which comprises impregnating growth medium with 3,4,5-trichloro-2-(trichloromethyl)pyridine, said impregnation being carried out in a nitrification suppressing amount of from about 0.01 part to about 4000 parts by weight per million parts by weight of growth medium.

6. A method useful for suppressing the nitrification of ammonium nitrogen in growth medium, for preventing rapid loss of ammonium nitrogen therefrom and for improving plant nutrition therein which comprises impregnating growth medium with 2-(trichloromethyl)pyridine, said impregnation being carried out in a nitrification suppressing amount of from about 0.01 part to about 4000 parts by weight per million parts by weight of growth medium.

7. A method useful for suppressing the nitrification of ammonium nitrogen in growth medium, for preventing rapid loss of ammonium nitrogen therefrom and for improving plant nutrition therein which comprises impregnating growth medium with 5-chloro-2-(trichloromethyl)pyridine, said impregnation being carried out in a nitrification suppressing amount of from about 0.01 part to about 4000 parts by weight per million parts by weight of growth medium.

8. A method useful for suppressing the nitrification of ammonium nitrogen in growth medium, for preventing rapid loss of ammonium nitrogen therefrom and for improving plant nutrition therein which comprises impregnating growth medium with 2-chloro-6-(trichloromethyl)pyridine, said impregnation being carried out in nitrification suppressing amount of from about 0.01 part to about 4000 parts by weight per million parts by weight of growth medium.

9. A method useful for suppressing the nitrification of ammonium nitrogen in growth medium and preventing rapid loss of ammonium nitrogen therefrom and improving plant nutrition therein which comprises impregnating growth medium with a (trichloromethyl)pyridine compound, said impregnation being carried out in a nitrification suppressing amount of from about 0.01 part to about 4000 parts by weight per million parts by weight of growth medium, and wherein said (trichloromethyl)pyridine compound is selected from the group consisting of (a) a compound having the formula

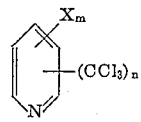

wherein each X is selected from the group consisting of hydrogen, methyl and chlorine, $n$ is an integer of from 1 to 3, inclusive, and $m$ is an integer having the value of $5-n$, and (b) mineral acid salts of (a) wherein said mineral acid salt is selected from the group consisting of hydrochlorides, nitrates, sulfates and phosphates.

10. A method for treating soil to inhibit the conversion therein of ammonium nitrogen to nitrate and nitrite nitrogen and to prevent rapid loss of ammonium nitrogen therefrom which comprises impregnating soil with a composition comprising a (trichloromethyl)pyridine compound in intimate admixture with a soil treating adjuvant, said impregnation being carried out in the growing area of soil and in an amount sufficient to provide a concentration therein of at least 0.01 part by weight per million parts by weight of soil, and wherein said (trichloromethyl)pyridine compound is selected from the group consisting of (a) a compound having the formula

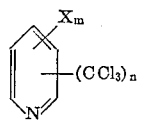

wherein each X is selected from the group consisting of hydrogen, methyl and chlorine, $n$ is an integer of from 1 to 3, inclusive, and $m$ is an integer having the value of $5-n$, and (b) mineral acid salts of (a) wherein said mineral acid salt is selected from the group consisting of hydrochlorides, nitrates, sulfates and phosphates.

11. In the fertilization of soil with a reduced nitrogen fertilizer, the step which comprises impregnating soil with a (trichloromethyl)pyridine compound in an operation substantially simultaneous with the administration of the reduced nitrogen fertilizer, wherein said impregnation is carried out in the growing area of soil and in a nitrogen conserving amount, said amount being sufficient to provide a concentration in soil of the (trichloromethyl)pyridine compound of at least 0.01 part by weight per million, and wherein said (trichloromethyl)pyridine compound is selected from the group consisting of (a) a compound having the formula

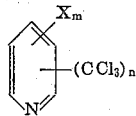

wherein each X is selected from the group consisting of hydrogen, methyl and chlorine, $n$ is an integer of from 1 to 3, inclusive, and $m$ is an integer having the value of $5-n$, and (b) mineral acid salts of (a) wherein said mineral acid salt is selected from the group consisting of hydrochlorides, nitrates, sulfates and phosphates.

12. A fertilizer composition comprising a reduced nitrogen fertilizer and a (trichloromethyl)pyridine compound, wherein the (trichloromethyl)pyridine compound is present in a concentration of at least about 0.05 percent by weight based on the weight of the reduced nitrogen present in the fertilizer, and wherein said (trichloromethyl)pyridine compound is selected from the group consisting of (a) a compound having the formula

wherein each X is selected from the group consisting of hydrogen, methyl and chlorine, $n$ is an integer of from 1 to 3, inclusive, and $m$ is an integer having the value of $5-n$, and (b) mineral acid salts of (a) wherein said mineral acid salt is selected from the group consisting of hydrochlorides, nitrates, sulfates and phosphates.

13. A method according to claim 9 wherein the (trichloromethyl)pyridine compound is added to growth medium in an amount sufficient to give a concentration therein of from 1 to 50 parts by weight per million parts by weight of growth medium.

14. A method according to claim 13 wherein the (trichloromethyl)pyridine compound is introduced in growth medium at a point near the roots of the growing plants.

15. A method according to claim 10 wherein the soil treating adjuvant is a reduced nitrogen fertilizer.

References Cited in the file of this patent
UNITED STATES PATENTS

| | | |
|---|---|---|
| 2,620,266 | Schlesinger | Dec. 2, 1952 |
| 2,679,453 | Brett et al. | May 25, 1954 |